United States Patent [19]
Brandon, Jr. et al.

[11] 3,862,291
[45] Jan. 21, 1975

[54] FOAM BACKED DRAPERY FABRICS AND METHOD OF MAKING THE SAME

[75] Inventors: William A. Brandon, Jr., Burlington; Allison Maggiolo, Greensboro, both of N.C.

[73] Assignee: Burlington Industries, Inc., Greensboro, N.C.

[22] Filed: Feb. 23, 1971

[21] Appl. No.: 118,079

[52] U.S. Cl. .......... 264/321, 117/76 T, 117/161 KP, 160/348
[51] Int. Cl. ............................................ A47h 23/10
[58] Field of Search ....... 264/49, 321; 260/88.1 PC; 117/161 KP

[56] References Cited
UNITED STATES PATENTS

| | | | |
|---|---|---|---|
| 1,933,052 | 10/1933 | Fikentscher et al. | 260/88.1 PC X |
| 2,575,259 | 11/1951 | Cox et al. | 264/321 X |
| 3,215,647 | 11/1965 | Dunn | 260/2.5 F UX |
| 3,281,258 | 10/1966 | Callahan | 264/293 |
| 3,394,210 | 7/1968 | Franze | 264/54 |
| 3,527,654 | 9/1970 | Jones et al. | 117/161 KP X |

OTHER PUBLICATIONS

Synthetic and Protein Adhesives for Paper Coating, Tappi Monograph Series No. 22, 1961, pages 76–80.

"Modern Plastics Encyclopedia Issue for 1965," Vol. 42, No. 1A, Sept. 1964, pp. 368–373.

Ritchie, P. D., Edt., Physics of Plastics, "Effect of Plasticizers, Fillers, and Other Additives on Physical Properties," by D. R. Lannon & E. J. Hoskins, Princeton, N.J., D. Van Nostrand, c1965, pp. 323–325, 327–330, 336–342, 344.

*Primary Examiner*—Ronald W. Griffin
*Attorney, Agent, or Firm*—Cushman, Darby & Cushman

[57] ABSTRACT

A textile fabric is coated with foamed polymeric composition of foamable polymeric composition which foams on the textile. The foamed material, while fluid, flows into initimate contact with the textile and gells. The laminate is impregnated with a cross-linking resin such as aminoplast which is cured to improve crush resistance and other physical properties of the foam. The laminate may be crushed, calendered or embossed prior to curing, the curing preserving the crushed or embossed state. The polymeric material is cross-linked with the resin and the resin may cross-link the textile. The cured laminate may be compressively shrunk. To improve cold weather resistance, a selected plasticizer is applied with the foamable composition.

2 Claims, 1 Drawing Figure

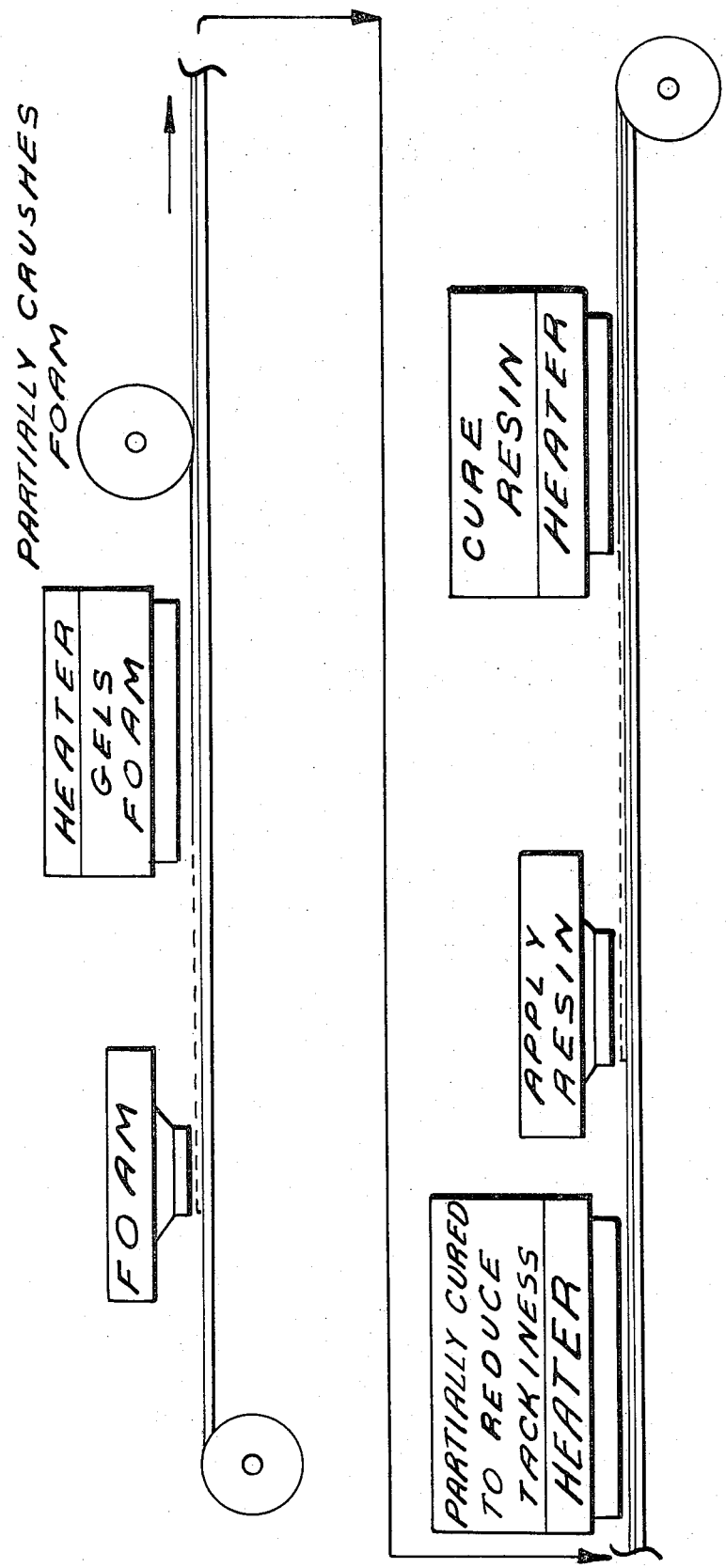

FOAM BACKED DRAPERY FABRICS AND METHOD OF MAKING THE SAME

The present invention relates to a laminated fabric and more specifically to a fabric composed of a layer of woven, knitted or other textile fabric and a layer of flexible polymeric foam material.

Draperies customarily are made from one or more layers of textile fabric. A typical drapery is a rectangular piece of fabric whose edges are folded back and hemmed. At the top of the drapery, it is customary to provide pleats, which improve the appearance. A drapery made from a single layer of textile material is less expensive than a lined drapery, but it suffers the difficulty that it is not fully opaque and that sunlight can cause fading of dyes. A lined drapery normally is composed of a relatively high quality fabric which is printed or in some other way carries a design, and a lining which is a less expensive plain woven fabric. The lining is turned outwardly, that is toward the window in front of which the drapery hangs. The lining reduces the amount of light shining through the drapery and the amount of sunlight to which the inner or more expensive layer is exposed. This improves the light fastness of the coloring material in the inner layer. The lining also adds opacity to the drape and makes it more difficult for outsiders to see inside the window. Moreover, the lining improves the heat insulating properties of the drapery by trapping air between it and the outer layers, and it adds weight to the drapery so that it hangs better. However, lined draperies are more expensive because of the cost of the lining fabric and also the cost of sewing it. It previously has been proposed to coat the back of drapery fabrics with solid plastics or synthetic resins such as cross-linked acrylic polymers. However, an adequate thickness of polymer is too heavy and too expensive.

In U.S. Patent of Jones and Brandon U.S. Pat. No. 3,527,654, a drapery is provided which is composed of a textile fabric having a foam polymeric material laminated to and in intimate contact with its reverse side. The foam-laminated fabric is supplied to the drapery manufacturer with the foam in place, so that the foam can be applied inexpensively to continuous lengths of fabrics during manufacture. The foam eliminates the need for sewing a lining to the facing fabric when the fabric is converted to a drapery. The drapery and foam lining in laminate form are cut at the same time thus eliminating a separate cutting operation for the lining. The laminate also offers the advantage of not having to have an inventory of lining fabric on hand during the manufacturing operation. The foam increases the opacity of the fabric more effectively than a light-weight lining fabric and possesses all of the other advantages of a lining. In addition, because of its low specific gravity it adds more bulk for a given weight than a lining. Another major advantage of the laminate is that since fabric and the foam are in intimate contact, the product is truly washable and dry cleanable and there is no danger of shrinkage or distortion of the drapery or lining material.

The said foam lining is composed of foam material which is applied to the fabric as a fluid or a material which is capable of becoming a fluid during the process so that it can flow into intimate contact with the fabric. After flowing into position, the fluid foam material is gelled, and, if necessary, cured to assume its permanent position in intimate contact with one side of the fabric. However, the foam may be compressed or calendered into a flattened condition after gelling but prior to curing. Also, embossed patterns or crushed effects may be added before the cure step. Thereafter, the laminate is treated with a durable crease cross-linking resin and, if necessary other finishing agents. The resin is cured, either before or after a drapery is formed, and provides the foam with better recovery when crushed and better durability to washing and dry cleaning. The resin also has an effect on the textile fabric in rendering it more crease-resistant.

Certain difficulties have been encountered when fabrics of this type are exposed to extremely low temperatures, e.g., when shipped in trucks during cold weather. Under such conditions, e.g., 0°-30°F., brittlenes developed leading to cracking. In accordance with the present invention, such difficulties are overcome by including, in the polymer composition which is foamed, small amounts of plasticizers for the polymer comprising the foam. While the plasticizer appears to be removed ultimately, during dry cleaning, it serves its purpose during shipment and is unnecessary once draperies are brought inside a building where extremely cold temperatures will not arise.

As in the case of the aforesaid U.S. Pat. No. 3,527,654 substantially any textile fabric can be used for the textile layer of the laminated fabric of this invention. In this regard, the term "textile fabric" includes fabrics which are woven or knitted, as well as non-woven fabrics composed of randomly arranged fibers, paper-like materials and the various sewn fabrics described in U.S. Pat. No. 3,030,786. The fabric may be made of any kind of fibers or filaments including natural fibers such as cotton, wool, sisal, jute, linen and silk; man-made fibers such as regenerated cellulose rayon, polynosic rayon, cellulose esters, e.g., cellulose acetate, cellulose acetate/butyrate and cellulose triacetate, synthetic fibers such as the acrylics, e.g., polyacrylonitrile, modacrylics, e.g., acrylonitrile-vinyl chloride copolymers, polyamides, e.g., polyhexamethylene adipamide (mylon 66), polycaproamide (nylon 6) and polyundecanoamide (nylon 11), polyolefin, e.g., polyethylene and polypropylene, polyester, e.g., polyethylene terephthalate, rubber and synthetic rubber, saran, glass, etc. The fabric will have a weight of 2 to 16 ounces per square yard although this is subject to variation depending upon the ultimate use.

It will be appreciated that if it is desired that the cross-linking resin used in the invention has an effect on the textile layer as well as on the foam layer, the textile layer must contain at least some cross-linkable fibers or filaments. Fibers, of this type include cellulosic materials such as cotton, linen and rayon. Blends of these fibers with other materials can be used. For example, very satisfactory products can be made from polyester-cotton blends, such as a 60% polyethylene terephthalate-40% cotton blend. Other blends containing a higher proportion of cotton can be used successfully, for example, 85% cotton and 15% polyethylene terephthalate.

The polymeric foam used in the foam layer is a cross-linkable acrylic polymer, for example a copolymer of styrene and acrylic acid as described in U.S. Pat. No. 3,215,647, formed from a latex containing a copolymer of styrene with another monomer having a reactive group such as acrylic acid. The latex may also contain a coreactive material which cross-links the styrene polymer and which is soluble in water or water-miscible solvents. This invention applies to either foam which is prepared from a latex containing reactive groups on the base polymer or coreactive within the latex itself. This also applies to a latex which may or may not require a reactant or cross-linking material added to the latex during compounding. The latex is foamed or frothed by bubbling in a gas or by decomposition of a gas-releasing material.

As plasticizers for the polymers comprising the foam layer, there may be mentioned phthalate plasticizers such as dibutyl, dihexyl, dioctyl, didecyl, and dibenzyl phthalates plus their mixed esters such as butyl decyl, butyl benzyl, etc. phthalates, phosphate plasticizers such as tributyl, trioctyl, and tricresyl phosphates plus their mixed esters, and fatty acid - dibasic acid/alcohol, glycol, polyglycol esters such as di and triethylene glycol dipelargonate; dibutyl, dibenzyl sebacate; polyethylene glycol poly adipate.

Instead of adding a plasticizer as a separate compound in the foam formulation, the plasticizer may be incorporated into the polymer itself the polymer being of the "internally plasticized" type. For example, polymers of the type described above may contain monomer units having side chains of about the same size as a plasticizer molecule, for example vinyl stearate or acrylates or methacrylate esters with long chain fatty alcohols such as n-hexadecyl acrylate and/or methacrylate. However, internal plasticization is less satisfactory than external plasticization because the internally plasticized products are less durable to dry cleaning, as compared to the above-mentioned plasticizers which are removed during dry-cleaning.

Various coating techniques may be used to apply fluid foams. These include knife over roll, roller coating, casting, knife over table and doctor blade over table. Since numerous suitable polymer coating techniques already are well known, they need not be described in detail here.

The foams normally contain pigments or dyes which render the fabric opaque and provide an ornamental effect. Opaqueness is provided by the coordinated effect of the foam and the dye or pigment. The foam, having numerous air-polymer interfaces at different angles, scatters light even though the polymer itself may be transparent. Therefore, little or no incident light is transmitted. The light scattering also increases the effectiveness of the dye or pigment. That is, the scattered light, to the extent that it might pass through the foam layer, has an irregular and therefore much longer path through the foam than it would have through an unfoamed mass of polymer having the same thickness. Since the amount of light absorbed increased exponentially with the path length, the effectness of the pigments is greatly multiplied.

Almost any dye or pigment may be used which is compatible with the polymer. Certain fillers, such as titanium dioxide, act as pigments and may be added to the foam compound. Fillers also function as extenders and provide opacity. The amount of dye or pigment usually will vary with the effect desired, but ordinarily it will vary from 0% to about 75% by weight of the foam. If chemical foaming agents are used, they should be inert with respect to the dye or pigments, but the selection of suitable materials is considered to be within the skill of the art. It also is possible to print on or emboss the exposed surface of the foam, or crush the foam to produce other ornamental effects.

The durable crease cross-linking resin used in accordance with this invention preferably is an aminoplast, that is a hardenable aminoplast of the well-known type. This term is used herein to describe hardenable, if desired etherified, carbamide and melamine precondensates which are either water soluble or of limited water solubility and which are obtained in the known manner by the condensation of formaldehyde or other aldehydes or ketones with compounds such as, for example, urea, thiourea, cyanamide, dicyandiamide, cyclic ethylene urea, biguanide, melamine, formamide, formoguanamine, ethyl carbamate, acetoguanamide, triazones, and the like, and mixtures of such compounds, as well as their alkyl and acyl derivatives. Subsequent methylation or other modification of the resulting N-methylol compounds or triazines often is beneficial. Especially good results are obtained by the use of N,N' dimethylol cyclic ethylene urea and various other condensation products of formaldehyde and melamine with urea.

"Precondensates of limited but substantial water solubility," in accordance with this invention, are those colloidal intermediates which occur by continuing condensing the product with aldehyde or ketone beyond the crystalline methylol stage. Characteristically, they are prepared from their concentrated aqueous solution by the addition of water. The condensation products of unlimited water solubility, which also may be used in accordance with this invention, are used in the form of aqueous solutions while those of limited water solubility are used either in the form of solutions of the condensation products which have been rendered soluble with the aid of acids, or in the form of dispersions.

The amount of the cross-linking resin used varies with the type of fabric and the use intended. However, about 4–25% by weight of the laminated fabric, including the textile layer and the foam layer, is preferred. Especially good results are obtained when the solids pickup is about 12%. The aminoplasts or other cross-linking resins are applied from aqueous solutions or dispersions which may include various other materials normally used with them. For example, the material may contain various softeners such as emulsified polyethylene, glycerol monostearate or the like. They may also contain a water repellant silicone, and also contain a catalyst for curing the cross-linking resin. Typical catalysts or cross-linking agents are formic, hydrochloric or sulfuric acids, maleic anhydride or the like. Other organic or inorganic acids or salts of strong acids with weak bases such as ammonium salts of sulfuric, nitric, oxalic, lactic or other strong inorganic acids, various amine hydrochlorides, or still other acid forming salts such as zinc fluoborate, zinc nitrate, magnesium chloride as well as Lewis acids such a aluminum chloride can also be used. The catalyst can usefully be added in an amount between about 1 and 10%, preferably about 2–5% based on the weight of resin present in the bath.

When practicing the invention, the textile layer is coated with the fluid foam and the foam layer is gelled. The temperature of gellation will depend on the type of foam used, but ordinarily it will be about 250°–400°F. The foam may be applied in more than one layer with gelling between coatings, but ordinarily this is not necessary. If the foam requires curing, this also may be accomplished before proceeding to the next stage. However, in accordance with a preferred embodiment of the present invention the polymer is not cured at this stage. The polymer in the foam is capable of cross-linking with itself leaving a few cross-linking sites on the copolymer unreacted. The unreacted site at least at the surface of the foam layer may interact with the aminoplast cross-linking resins. This provides more secure attachment of the foam layer to the aminoplast resin.

The fabric, after gelling the foam, and any mechanical treatment, is treated with the aminoplast either as a solution or dispersion. However, it is preferred to give the fabric a partial cure at this point, i.e., after mechanical treatment but before the fabric is treated with aminoplast. This step gives a considerably improved fabric, and more especially reduces tackiness. Conditions for the partial cure are 275° to 400°F. for about ½ to 3 minutes. Then, after aminoplast treatment, the fabric is dried, preferably at a temperature of 200°–400°F. for about 30 seconds to 5 minutes, and in any event to below the normal moisture content of the textile fabric. Then it is cured. The cure temperature may be as high as 800°F. for a flash cure, but ordinarily is about 200°–400°F. for about 30 seconds to 6 minutes. Preferred conditions are about 2 minutes at 340°F. Finally, the fabric is compressively shrunk.

The term compressive shrinkage or compressively shrinking refers to the known process normally used to provide dimensional stability and to prevent further shrinkage during laundering of e.g., woven fabrics. The process is described in detail in the *American Cotton Handbook* (second edition), 1949, and in prior U.S. Patents such as U.S. Pat. No. 1,861,422; 1,861,423; 1,861,424; 1,944,001; 2,078,528; 2,082,981; 2,084,367; 2,450,022; and 2,721,370. In this process, the fabric is passed through an apparatus known as a compressive shrinkage range. In one form of apparatus used in the process, a thick blanket is passed over a relatively small diameter roller and then around a large drum. The path of the blanket is S-shaped so that one surface of the blanket is turned out as the blanket passes over the small roller and then turned in to lie against the drum. The blanket may be, for example, a thick pile fabric. As it passes over the small roller, the outer edges of the tufts of the blanket are spread apart. Then, as it turns against the drum, the tips of the tufts come back together again. The fabric which is to be compressively shrunk is laid on the blanket when the tufts are spread apart. As the tufts come together again, the fabric is caused to shrink to conform to the reduced surface area of the outer face of the blanket. The fabric at this point is against the drum, and therefore cannot buckle. Consequently, there is a kind of mechanical compression of the fabric in the machine direction which has the effect of mechanically-induced shrinkage. On a microscopic scale, this is accomplished by rearranging the fibers in the fabric.

Of course other types of apparatus for compressively shrinking fabrics may be used. In all cases, the fabric is compressed in the machine direction while constrained against buckling.

Ordinarily, the fabric is moisturized before insertion in the compressive shrinkage apparatus, to permit the fibers to rearrange more easily, and a heated shoe may be laid over the small diameter roller referred to above. In most cases the fabric is passed through two compressive shrinkage machines, with inversion of the fabric between them. The reason for this is that the fabric is ironed when it contacts the heated drum. By inverting the fabric between passes, both surfaces of the fabric are ironed.

The amount of shrinkage which can be produced in a shrinkage range can be adjusted by varying the tension of the blanket and the relative speed of the blanket and the large diameter drum. In the present invention, the degree of shrinkage normally is about ½ to 4%.

The order of steps described above is particularly preferred. If the fabric is compressively shrunk before the foam material is applied, the shrinkage will come out during coating of the foam material. This is due to the tension applied to the fabric during the foam application and the slight wetting out of the fabric from the water present in the foam compound. Furthermore, the compressive shrinkage has desirable effects on the foam itself. If the cross-linking resin is applied to the fabric before the foam, so that it is applied only to the textile material and not to the foam layer, the foam will not have the benefit of the resin. The resin improves the recovery of the foam when depressed and gives it better durability to washing and dry cleaning. In the case of crushed or embossed foam, the resin treatment improves the durability of the desired flattened appearance and also improves the stability to multiple launderings. Also, if the foam were not reacted with resin, it would set with wrinkles and the like when the fabric is rolled up. Compressive shrinkage of the foam before the resin treatment, rather than after compressive shrinkage in accordance with the preferred mode of operation, results in greater working loss and less controlled shrinkage.

The completed fabric can receive other treatments. For example, the fabric can be treated with the soil release coating described in the applicaltion of Hinton et al., Ser. No. 604,649, filed Dec. 27, 1966 now abandoned, commonly assigned with this invention. or it may receive other treatments. This treatment also can be applied to the fabric at an earlier stage, for example, before compressive shrinkage, but after the cross-linking resin has been cured.

The following examples illustrate the practice of the invention.

EXAMPLE I

The following foam compound was prepared:

| | Dry Parts | Wet Parts | % Solids |
|---|---|---|---|
| B.F. Goodrich Hycar 2679* (a reactive acrylic copolymer) | 100 | 222.2 | 45 |
| Butyl Benzyl Phthalate | 16 | 16 | 100 |
| Titanium Dioxide Dispersion | 20 | 40 | 50 |
| Water Washed Clay | 30 | 30 | 100 |
| Ammonium Stearate | 6 | 40 | 15 |
| Aerotex Resin M-3** | 2 | 2.5 | 80 |

*Hycar 2679 is a heat-reactive acrylic latex having the following properties: percent solids 49.7; pH 4.0; specific gravity of latex 1.063; specific gravity of polymer 1.135; Brookfield viscosity (LVF-60 RPM) 22JCPS, surface tension 46.2 dynes/cm; allen stability (% coagulum) 0.01. Other properties are as described in the Bulletin entitled "Technical Data", Hycar 2679 (Revised: January, 1965) published by B. F. Goodrich Chemical Company.
**A melamine-formaldehyde condensate.

The above compound was foamed to a wet density of approximately 75 gm./per 500 cc. and was knife coated on to the back of a filament rayon warp and cotton filling drapery fabric so as to deposit approximately 3.0 oz. of dry foam solids per square yard. The foam was then dried in an enclosed tenter frame at 280°F. for 1 minute. The foam backing was then crushed by passing the coated cloth through squeeze rolls set at 10 tons of crushing force. The crushed foam backing was then partially cured by passing the coated cloth over a series of 12 heated dry cans set at 310°F. The coated cloth was then resin finished with the following formula.

250 gals. of mix

| | |
|---|---|
| 500 lbs. Urea-formaldehyde resin | 25% solids |
| 100 lbs. methylated urea-formaldehyde resin | 50% solids |
| 60 lbs. Silicone Water Repellent | 40% solids |
| 80 lbs. Polyethylene Softener | 30% solids |
| 60 lbs. Nonionic Softener | 25% solids |
| 40 lbs. Zinc Nitrate Catalyst | 30% solids |

The foam-coated cloth was padded through the above formula with a wet pick-up of approximately 100%. The cloth was then dried in an enclosed tenter frame for 1 minute at 325°F. The coated cloth was next given a process wash at 115°F. through a continuous rope washer, squeezed to remove excess water, dried in an enclosed tenter frame, and compressively shrunk.

A satisfactory drapery fabric having an excellent self-lined appearance was obtained. The crushed foam backing was durable to five washes and also to five dry cleanings and was found not to crack when flexed at temperatures of 0°F. and above.

EXAMPLE II

The following foam compound was prepared using a soft acrylic polymer in lieu of a separately added plasticizer:

| | Dry Parts | Wet Parts | % Solids |
|---|---|---|---|
| Poly-Tex 6304* (an acrylic copolymer) | 100 | 222.2 | 45 |
| Titanium Dioxide Dispersion | 20 | 40 | 50 |
| Water Washed Clay | 30 | 30 | 100 |
| Ammonium Stearate | 6 | 40 | 15 |
| Aerotex Resin M-3** | 2 | 2.5 | 80 |

*Poly-Tex 6304 is a medium soft, self-reactive acrylic latex which is curable upon heating. The latex comprises 46% solids, has a viscosity (Brookfield RVT, No. 3 Spindle, 20 RPM at 25°C.) of 1000, a pH of 6.5, surface tension 52 dynes/cm, inherent viscosity of 2.3 and Tg of −80°C.
**A melamine-formaldehyde condensate.

The above compound was foamed, knife coated onto drapery fabric, dried, partially cured, and the coated cloth was resin finished, dried, cured washed and compressively shrunk as in Example I. A satisfactory drapery fabric having an excellent self-lined appearance was obtained. The crushed foam backing was durable to five washes and three dry cleanings. The backing did not crack when flexed at 0°F.

In the foregoing examples, all parts and percentages are by weight. Resistance to low temperature cracking was determined by the following test method:

BRITTLENESS TO LOW TEMPERATURE BY ROLLER METHOD

Scope

This method covers the determination of the temperature at which foam backed drapery exhibits a brittle failure under specified weight flex conditions. Data obtained by this method may be used to predict the behavior of foam backed drapery at low temperature when flexed or weight is applied to the foam backed drapery at low temperature.

Apparatus

Conditioning equipment that will hold temperatures of −20°F.

Roller — shall be constructed of cold rolled steel, weight 10 pounds, size measures 3 6/10 inch × 3½ inch with a wood handle fixed to the roller.

Die 8 × 8 inch to cut the test specimen.

Thermometer −20°F.

Steel Plate 6 × 10 inches.

Test Specimens

The test specimens shall be cut 8 inches by 8 inches parallel to filling and parallel to warp. The specimen is folded with the foam side out so as to form a 4 inch by 8 inch specimen; a small loop will form when the specimen is foled over. Four staples shall be crimped through the folded specimen approximately one-fourth inch from end of specimen and parallel to the 4-inch fold, the folding of specimen at room temperature.

Condition

Test specimens shall be conditioned prior to test for 30 minutes or longer.

Procedure

Place the 10-pound roller tester and the 6 × 10-inch steel plate in the cold conditioning chamber at the desired testing temperature for a conditioning period of 1 hour. Expose the specimens to the test temperature for 30 minutes. Check the thermometer to see if desired temperature is correct at the level the test is to be made. Place each of the folded specimens individually on the steel plate with the loop approximately 1 inch from the side of the plate. Roll the 10-pound steel roller over the loop one time; care should be taken to not apply any pressure to the roller. Repeat until each of the specimens has been tested. Remove the specimens and examine for failure. Partial fracture shall be construed as failure, as well as complete division into two or more pieces. Adjust the temperature of the cold condition chamber and condition a second group of ten specimens for 30 minutes at a suitable temperature as indicated by the results of testing the first group of specimens. Repeat the testing procedure and examination. When testing for specification it shall be satisfactory to accept material on basis of testing a minimum of specimens to determine the failure point.

In making drapes from finished good according to this invention, the procedure used may be that described in Farrell U.S. Pat. No. 3,399,714, especially with respect to FIGS. 6–13 thereof. Briefly, a continuous length of the finished drapery fabric is taken from its roll or other package and is continuously folded and then sewed with a hem, first along one side edge and then along the other side edge, or along both side edges simultaneously. The hemmed length is then cut transversely into predetermined shorter lengths, each of which will be subsequently converted into a drapery panel. The cut segments allow sufficient material for top and bottom hems, so that, after folding and hemming, the finished drape will be of the desired length. The cutting operation may be performed automatically as the fabric is run out of the hemming operation, or it may be performed subsequently on a batch basis.

Next, the lower edge portion of the cut drapery length is accurately creased so as to form two transverse fold lines preparatory to forming a bottom hem. One fold line may be two inches above the bottom edge, and the next fold line may be four inches above the two inch fold line. The creasing operation is carried out by suitable equipment adapted to perform this function. The two inch fold hides the cut edge, and the four inch fold provides a neat hem, with sufficient fabric to permit any subsequent consumer adjustments.

Each hem is transversely machine stitched. The previously-mentioned creasing operation facilitates the folding steps so that the hems can be formed rapidly and accurately.

Next, a strip of stiffening material such as buckram binding may be secured to the top edge of the cut drapery length. This is accomplished by first placing the lower edge portion of the buckram or other strip over the upper edge portion of the cut drapery length and stitching the two layers together. The buckram strip is then folded along its lower edge so as to place the previously exposed surface of the buckram strip against the drapery fabric. The cut drapery length is then turned over, and the top hem, defined by the buckram or other stiffening strip and a portion of the drapery fabric, can be pleated in any convenient manner. Commercially, this may be done by first feeding the top hem portion into an automatic pleat crimping apparatus which presses a plurality of spaced-apart, three-fold pleats into the heading, followed by sewing to hold the pleats, or by sewing and "fastening" as in Farrell U.S. Pat. No. 3,399,714, using the pleat retainer thereof. Typically, the folds of the finished pleat are not sewed, in as much as this would falten the outermost pleat portions and render them immobile. Style and fashion currently demand a folded but not flattened appearance.

In the above description, reference has been made to certain prior U.S. Patents and pending U.S. patent applications. The disclosure of each of them is incorporated herein by reference, to avoid the need to reproduce them in this disclosure. The drawing is a schematic flow diagram illustrating the steps of the process.

It will be appreciated that various changes may be made in detail regarding the materials, processes and products described herein without departing from the invention as defined in the appended claims. Similarly, it will be understood that, while the fabrics are especially useful for draperies, they also are well suited for slipcovers, upholstery, tablecloths and wall-coverings.

What is claimed is:

1. A process for manufacturing a foam-laminated fabric useful for draperies, slipcovers, upholsteries, tablecloths, wall-coverings and the like, comprising:
   applying to one side of a textile fabric a foamed or foamable composition comprising a cross-linkable acrylic polymer and a plasticizer for said polymer,
   flowing foamed polymeric composition while fluid into intimate contact with said textile fabric, and gelling the foamed polymeric composition,
   compressing the foam-coated fabric to at least partially crush the gelled foam,
   partially curing the fabric and at least partially-crushed foam sufficiently to reduce tackiness,
   applying to the textile fabric and the gelled foam polymeric composition a cross-linkable aminoplast resin,
   and thereafter heating the foam-coated textile fabric to cure said resin,
   whereby said foam has increased resistance to crushing, laundering and cracking when exposed to extremely low temperatures.

2. A process for manufacturing a foam-laminated fabric useful for draperies, slipcovers, upholsteries, tablecloths, wall-coverings and the like, having improved resistance to cracking when exposed to extremely low temperatures, comprising
   appying to one side of a textile fabric a foamed or foamable composition comprising a cross-linkable acrylic polymer and a plasticizer for said polymer which is removable from the fabric during dry cleaning
   flowing foamed polymeric composition while fluid into intimate contact with said textile fabric, and gelling the foamed polymeric composition,
   compressing the foam-coated fabric to at least partially crush the gelled foam,
   partially curing the fabric and at least partially crushed foam sufficiently to reduce tackiness,
   applying to the textile fabric and the at least partially crushed foamed polymeric composition a resin which is cross-linkable therewith,
   and thereafter heating the foam-coated textile fabric to cure said resin,
   whereby said foam has improved resistance to crushing and laundering.

* * * * *

UNITED STATES PATENT OFFICE
CERTIFICATE OF CORRECTION

Patent No. 3,862,291                Dated January 21, 1975

Inventor(s) William A. BRANDON, Jr., et al

It is certified that error appears in the above-identified patent and that said Letters Patent are hereby corrected as shown below:

IN THE SPECIFICATION:

Column 2, line 15, change "brittlenes" to --brittleness--.

Column 2, line 41, change "mylon 66" to --nylon 66--.

Column 2, line 52, delete the comma after "Fibers".

Column 3, line 19, change "dibutyl, dibenzyl" to --dibutyl or dibenzyl--.

Column 3, line 22, insert a comma after "itself".

Column 3, line 55, change "effectness" to --effectiveness--.

Column 4, line 47, change "repellant" to --repellent--.

Column 6, line 35, change "applicaltion" to --application--.

Column 7, line 50, insert a comma after "cured".

Column 8, line 47, change "good" to --goods--.

Column 9, line 30, change "in as much" to --inasmuch--; change "falten" to --flatten--.

Signed and sealed this 15th day of July 1975.

(SEAL)
Attest:

RUTH C. MASON
Attesting Officer

C. MARSHALL DANN
Commissioner of Patents
and Trademarks